US011933534B2

(12) United States Patent
Je et al.

(10) Patent No.: US 11,933,534 B2
(45) Date of Patent: Mar. 19, 2024

(54) REFRIGERATOR AND CONTROL METHOD THEREOF

(71) Applicant: Samsung Electronics Co., Ltd., Suwon-si (KR)

(72) Inventors: Sangky Je, Suwon-si (KR); Jeongbo Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 832 days.

(21) Appl. No.: 17/066,836

(22) Filed: Oct. 9, 2020

(65) Prior Publication Data

US 2021/0190407 A1 Jun. 24, 2021

(30) Foreign Application Priority Data

Dec. 24, 2019 (KR) ........................ 10-2019-0174047

(51) Int. Cl.

| | |
|---|---|
| ***F25B 21/04*** | (2006.01) |
| ***F24F 11/63*** | (2018.01) |
| ***F24F 11/65*** | (2018.01) |
| ***F25D 21/04*** | (2006.01) |
| ***F25D 23/02*** | (2006.01) |

(Continued)

(52) U.S. Cl.

CPC .............. *F25D 21/04* (2013.01); *F24F 11/63* (2018.01); *F24F 11/65* (2018.01); *F25D 23/028* (2013.01); *H05B 1/0252* (2013.01); *H05B 3/12* (2013.01); *H05B 3/28* (2013.01); *H05B 3/286* (2013.01); *F24F 2110/10* (2018.01); *F24F 2110/12* (2018.01); *F24F 2110/22* (2018.01); *H05B 2203/005* (2013.01)

(58) Field of Classification Search

None

See application file for complete search history.

(56) References Cited

U.S. PATENT DOCUMENTS 7,659,491 B2 2/2010 Yang
8,677,773 B2 * 3/2014 Lee ......................... F25D 21/04 62/331

(Continued)

FOREIGN PATENT DOCUMENTS

CN 204285940 U 4/2015
EP 2 085 725 A2 8/2009

(Continued)

OTHER PUBLICATIONS

KR20090084046A, Aug. 2009, Chae et al., partial translation (Year: 2009).*

(Continued)

*Primary Examiner* — Joseph M. Pelham

(74) *Attorney, Agent, or Firm* — STAAS & HALSEY LLP

(57) ABSTRACT

A refrigerator is provided. The refrigerator includes: a body having a storage compartment; a door pivotally coupled to the body to open and close the storage compartment; a planar heater including first heating wires arranged to surround an edge of the door and second heating wires arranged on only one portion of the edge; a sensor configured to measure at least one of temperature and humidity outside the refrigerator; and a processor configured to control driving of at least one of the first heating wires and the second heating wires based on a measured value of the sensor.

14 Claims, 6 Drawing Sheets

(51) Int. Cl.

| | |
|---|---|
| ***H05B 1/02*** | (2006.01) |
| ***H05B 3/12*** | (2006.01) |
| ***H05B 3/22*** | (2006.01) |
| ***H05B 3/26*** | (2006.01) |
| ***H05B 3/28*** | (2006.01) |
| *F24F 110/10* | (2018.01) |
| *F24F 110/12* | (2018.01) |
| *F24F 110/22* | (2018.01) |

(56) References Cited

U.S. PATENT DOCUMENTS

| | | | | |
|---|---|---|---|---|
| 10,288,341 | B2 | 5/2019 | Chae et al. | |
| 11,859,900 | B2 * | 1/2024 | Choi | F25D 11/02 |
| 2006/0138124 | A1 | 6/2006 | Yang | |
| 2010/0192608 | A1 * | 8/2010 | Lee | F25D 21/04 62/449 |
| 2012/0000899 | A1 * | 1/2012 | Eom | H05B 3/565 219/385 |
| 2017/0191744 | A1 * | 7/2017 | Koo | F25D 29/005 |
| 2017/0191746 | A1 * | 7/2017 | Seo | F25D 27/005 |
| 2018/0187947 | A1 | 7/2018 | Chae et al. | |
| 2021/0164719 | A1 * | 6/2021 | Kim | F25D 23/04 |

FOREIGN PATENT DOCUMENTS

| | | | |
|---|---|---|---|
| JP | 52-35667 | | 3/1977 |
| JP | 7-222656 | A | 8/1995 |
| KR | 10-2005-0003704 | A | 1/2005 |
| KR | 20-0385918 | Y1 | 6/2005 |
| KR | 10-2006-0068767 | A | 6/2006 |
| KR | 10-2006-0075158 | A | 7/2006 |
| KR | 10-0686764 | B1 | 2/2007 |
| KR | 10-0716286 | B1 | 5/2007 |
| KR | 20090080730 | A * | 7/2009 |
| KR | 10-2009-0084046 | A | 8/2009 |
| KR | 10-1620429 | B1 | 5/2016 |
| KR | 20180055241 | A * | 5/2018 |
| KR | 10-2019-0024487 | A | 3/2019 |
| KR | 10-2019-0097619 | A | 8/2019 |
| WO | WO 2015/160227 | A1 | 10/2015 |
| WO | WO 2020/149498 | A1 | 7/2020 |

OTHER PUBLICATIONS

KR20190024487A, Mar. 2019, Kim et al., partial translation. (Year: 2019).*

KR20180055241A, May 2018, Cho et al., partial translation (Year: 2018).*

European Search Report dated Aug. 23, 2022, issued in the European Patent Application No. 20906726.3.

International Search Report dated Mar. 11, 2021, in corresponding International Patent Application No. PCT/KR2020/016158.

Written Opinion of the International Searching Authority dated Mar. 11, 2021, in corresponding International Patent Application No. PCT/KR2020/016158.

* cited by examiner

REFRIGERATOR AND CONTROL METHOD THEREOF

CROSS-REFERENCE TO RELATED APPLICATION(S)

This application is based on and claims priority under 35 U.S.C. § 119 to Korean Patent Application No. 10-2019-0174047, filed on Dec. 24, 2019, in the Korean Intellectual Property Office, the disclosure of which is incorporated by reference herein in its entirety.

BACKGROUND

Field

Apparatuses and methods consistent with the disclosure relate to a refrigerator, and more particularly, to a refrigerator having an improved heater structure to prevent a dew formation phenomenon.

Description of the Related Art

In general, a refrigerator is a household appliance capable of keeping food fresh for a long time by having a storage compartment storing the food and a cold air supply device supplying cold air to the storage compartment.

A temperature inside the refrigerator is lower than a temperature outside the refrigerator, and dew may thus be formed inside the refrigerator in case that the door is opened. A heater has been conventionally installed on a door frame to prevent such a dew formation phenomenon.

However, the heater is operated at the same position with the same power irrespective of an environment inside and outside the refrigerator, and is thus unable to efficiently remove the dew from the refrigerator.

SUMMARY

Embodiments of the disclosure overcome the above disadvantages and other disadvantages not described above. In addition, the disclosure is not required to overcome the disadvantages described above, and an embodiment of the disclosure may not overcome any of the problems described above.

According to an embodiment of the disclosure, a refrigerator includes: a body having a storage compartment; a door pivotally coupled to the body to open and close the storage compartment; a planar heater including first heating wires arranged to surround an edge of the door and second heating wires arranged on only one portion of the edge; a sensor configured to measure at least one of temperature and humidity outside the refrigerator; and a processor configured to control driving of at least one of the first heating wires and the second heating wires based on a measured value of the sensor.

The second heating wires are arranged on a side edge of the door, most spaced apart from hinges respectively connecting the door and the body to each other.

The second heating wires are arranged extending to at least one of an upper side edge or a lower side edge, adjacent to the side edge.

The processor is configured to determine an operating duty of each of the first heating wires and the second heating wires based on at least one of a difference between temperatures inside and outside the refrigerator, and the humidity outside the refrigerator.

The processor is configured to determine an operating mode of the refrigerator based on at least one of the temperature and the humidity, measured by the sensor, and is configured to allow only the first heating wires to be driven in case that the determined operating mode is a normal mode and allow the first heating wires and the second heating wires to be driven together in case that the determined operating mode is a high temperature and high humidity mode.

The first heating wires and the second heating wires have heating performances different from each other.

The planar heater includes: a base film, a plurality of heating wires including the first and second heating wires and printed on one surface of the base film, a protective film laminated on the one surface of the base film to protect the plurality of heating wires; and a double-sided tape attached to the protective film.

The plurality of heating wires are printed with silver (Ag) nano ink.

The base film includes polyethylene terephthalate (PET) material.

The protective film includes ethylene-vinyl acetate copolymer (EVAC) material.

The door includes an inner door having an opening and an outer door pivoted in front of the inner door to open and close the opening, and the planar heater is installed on the inner door.

According to another embodiment of the disclosure, a control method of a refrigerator includes: measuring at least one of temperature and humidity outside the refrigerator; and driving at least one of first heating wires arranged to surround an edge of a door and second heating wires arranged on only one portion of the edge, based on a measured value.

The control method of a refrigerator further comprises determining an operating duty of each of the first heating wires and the second heating wires based on a difference between temperatures inside and outside the refrigerator, and the humidity outside the refrigerator, wherein in the driving of the heating wires, at least one of the first heating wires and the second heating wires are driven based on the operating duty of each of the first heating wires and the second heating wires.

The control method of a refrigerator further comprises determining an operating mode of the refrigerator based on the measured temperature and humidity, wherein in the driving of the heating wires, only the first heating wires are driven in case that the determined operating mode is a normal mode, and the first heating wires and the second heating wires are driven together in case that the determined operating mode is a high temperature and high humidity mode.

Additional and/or other aspects and advantages of the disclosure are set forth in part in the description which follows and, in part, are obvious from the description, or may be learned by practice of the disclosure.

BRIEF DESCRIPTION OF THE DRAWINGS

The above and/or other aspects of the disclosure are more apparent by describing certain embodiments of the disclosure with reference to the accompanying drawings, in which.

DETAILED DESCRIPTION

Embodiments described below are illustratively described to assist in understanding of the disclosure, and it is to be understood that the disclosure may be variously modified and executed unlike the embodiments described herein. However, if it is decided that a detailed description for the known functions or components related to the disclosure may obscure the gist of the disclosure, the detailed description and concrete illustration are omitted. Further, the accompanying drawings are not illustrated to scale, but sizes of some of components may be exaggerated to assist in the understanding of the disclosure.

Terms used in the specification and claims are selected as general terms in consideration of the functions in the disclosure. However, these terms may be changed depending on the intention of those skilled in the art, legal or technical interpretation, the emergence of a new technique and the like. In addition, some terms arbitrarily chosen by an applicant may exist. In this case, the meanings of such terms are mentioned in detail in corresponding description portions of the disclosure. Therefore, unless defined in detail, these terms may be interpreted on the basis of the contents throughout the disclosure and common technical knowledge in the art unless defined in detail.

In the disclosure, an expression 'have', 'may have', 'include', 'may include' or the like, indicates existence of a corresponding feature (for example, a numerical value, a function, an operation, a component such as a part or the like), and does not exclude existence of an additional feature.

In addition, the disclosure describes components necessary for the description of each embodiment of the disclosure, and is not necessarily limited thereto. Therefore, some components may be changed or omitted, and other components may be added. In addition, the components may also be distributed and arranged in independent devices different from each other.

Further, the embodiments of the disclosure are described in detail with reference to the accompanying drawings and contents described in the accompanying drawings, but the disclosure is not limited or restricted to the embodiments.

The disclosure provides a refrigerator having an improved heater structure to prevent a dew formation phenomenon.

Hereinafter, the disclosure is described in more detail with reference to the accompanying drawings.

Figure 1:
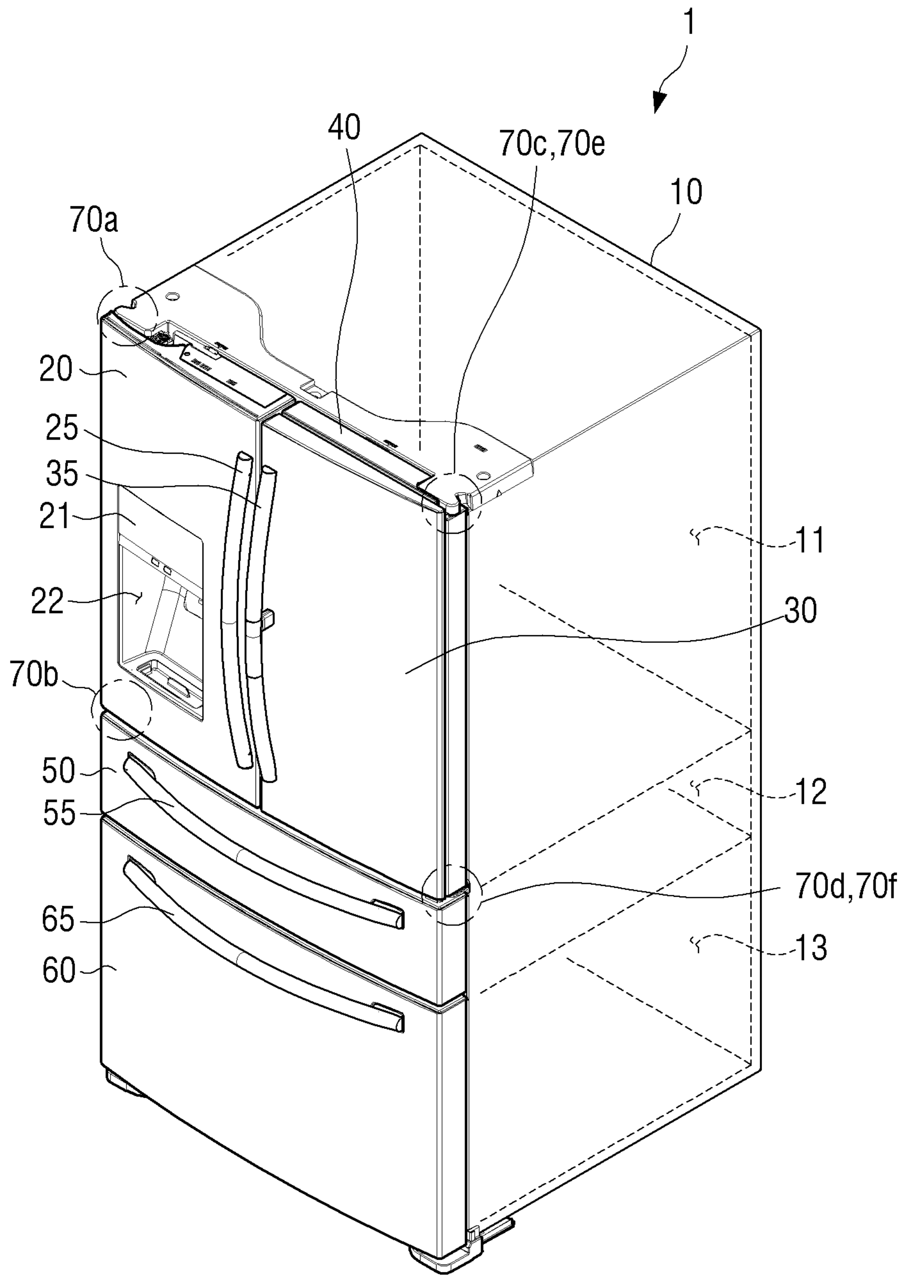
FIG. 1 is a perspective view of a refrigerator according to an embodiment of the disclosure.
Figure 2:
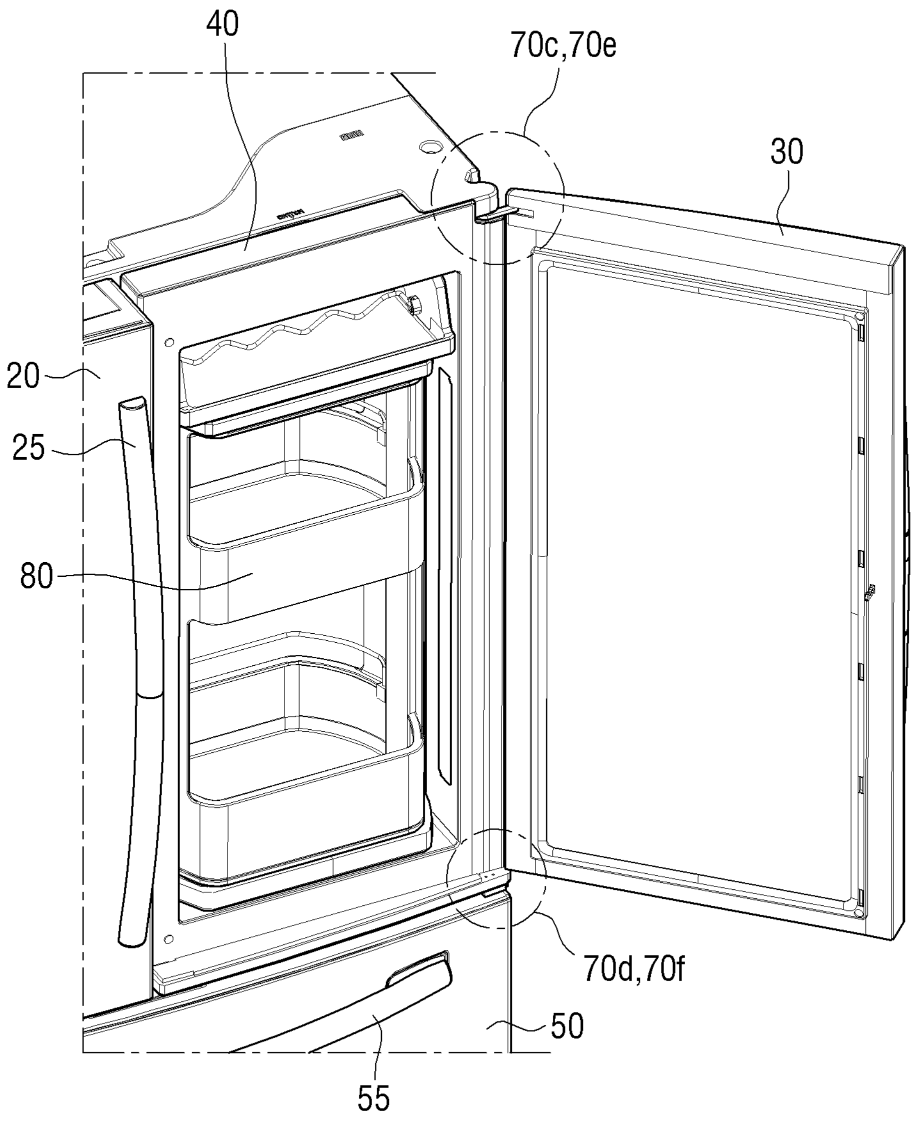
FIG. 2 is an enlarged perspective view of the refrigerator with a second door opened.

FIG. 1 is a perspective view of a refrigerator 1 according to an embodiment of the disclosure. FIG. 2 is an enlarged perspective view of the refrigerator with a second door 30 opened.

Referring to FIGS. 1 and 2, the refrigerator 1 may include: a body 10; doors 20, 30 and 40; drawers 50 and 60; and hinges 70.

The refrigerator 1 may be a device for storing food or drugs at a predetermined temperature to chill or not to spoil the food or drugs. The refrigerator 1 is shown in a shape of a general household refrigerator, but is not limited thereto. The refrigerator 1 may be a kimchi refrigerator, alcohol refrigerator, cosmetic refrigerator, etc.

The body 10 may have a shape of an approximately rectangular parallelepiped with an open front surface, but is not limited thereto and may be formed in various sizes and shapes.

FIG. 1 shows that the refrigerator 1 has the doors 20 and 30 on both sides of its upper portion and the drawers 50 and 60 on its lower portion, but the refrigerator 1 is not limited thereto. Depending on a layout of the doors 20 and 30, drawers 50 and 60 and storage compartments 11, 12 and 13, the refrigerator 1 may be a French door type, a side-by-side type, etc.

The body 10 may have the storage compartments 11, 12 and 13 which are formed inside the body 10 and open by the opening and closing doors 20, 30 and 40 to store water, beverages and refrigerated or frozen food.

The body 10 may include an inner case (not shown) forming the storage compartments 11, 12 and 13, an outer case (not shown) forming the outside of the refrigerator and an insulating material (not shown) maintaining a temperature difference between the inner case and the outer case.

The insulating material may prevent cold air inside the storage compartments 11, 12 and 13 from leaking to the outside, and prevent outside heat from entering the storage compartments 11, 12 and 13.

The storage compartments 11, 12 and 13 may be divided from one another by partitions disposed inside the body 10. The storage compartments 11, 12 and 13 may be divided into freezer compartments 12 and 13 respectively disposed at the lower portion of the refrigerator 1 and a refrigerator compartment 11 disposed at its upper portion. However, the freezer compartments 12 and 13 and the refrigerator compartment 11 are not limited to this arrangement, and may be arranged in reverse positions.

The first door 20 may open and close a portion of a front surface of the storage compartment 11 by being pivoted at an angle (e.g. 300° or less) determined by hinges 70*a* and 70*b*.

The first door 20 may display functions and settings of the refrigerator 1 on its surface, and may include an operation panel 21 changeable by a user's input (e.g., touch or button selection), a dispenser 22 for providing water, ice or carbonated water, and/or a graspable handle 25.

The second door (or outer door) 30 and/or the third door (or inner door) 40 may be respectively pivoted at an angle (e.g., 300° or less) determined by hinges 70*c* to 70*f*, to open and close the other portion of the front surface of the storage compartment 11.

The second door 30 may include a graspable handle 35. The handle 25 of the first door 20 and the handle 35 of the second door 30 may be positioned to be spaced apart from each other with respect to a central area of the storage compartment 11.

The second door 30 and the third door 40 opening and closing the other portion of the first storage compartment 11 may be installed as double doors. However, the disclosure is not limited thereto, and the first door 20 and its adjacent door may be installed as double doors.

The second door 30 may be relatively pivotally coupled to the third door 40. That is, the second door 30 may be opened or closed independently from the third door 40, and may be opened or closed together with the third door 40.

The third door 40 may include an opening corresponding to the other portion of the first storage compartment 11. The opening of the third door 40 may be opened or closed by the second door 30.

In case that the second door 30 is opened by the user, a door guard 80 installed in the opening of the third door 40 may be exposed to the outside. The door guard 80 may include a plurality of shelves capable of storing the food, and may be detachably coupled to the third door 40.

The user may open only the second door 30, and may easily access the food and the like, stored in the door guard 80. In addition, the leakage of the cold air to the outside of the refrigerator 1 in case that only the second door 30 is opened may be reduced than in case that the second door 30 and the third door 40 are opened together.

As described above, the second door 30 and the third door 40 may be disposed double, and each door may be configured to be able to be pivoted relatively to each other. Accordingly, the food may be put in and out in various ways based on the user's need, and the leakage of the cold air may be minimized.

Meanwhile, in case that the second door 30 and the third door 40 are closed, the third door 40 may maintain a low temperature by the cold air supplied to the inside of the first storage compartment 11. In case that the user opens the second door 30, dew may be formed on a front surface of the third door 40 due to a temperature difference between the third door 40 and the outside air.

As described below, this dew formation phenomenon may be resolved by installing a planar heater 100 (see FIG. 4) along an edge of the third door 40.

Figure 3:
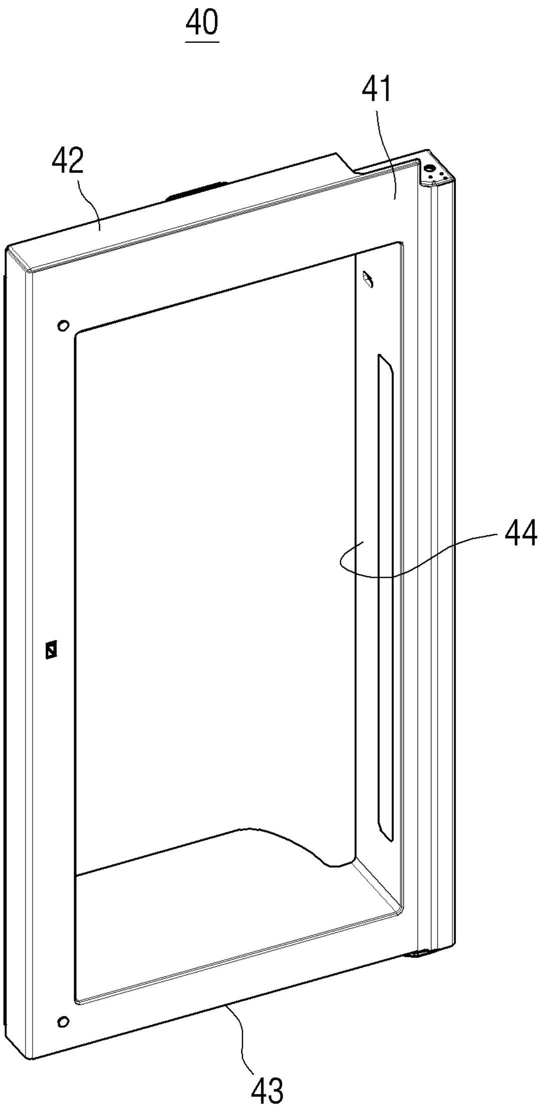
FIG. 3 is a perspective view of a third door from which a door guard is separated.

FIG. 3 is a perspective view of the third door 40 from which the door guard 80 is separated. Referring to FIG. 3, the third door 40 may include a door frame 41 having the opening, an upper frame 42 and a lower frame 43 respectively disposed on upper and lower sides of the third door 40 and a guard support 44 coupled to a rear side of the door frame 41.

A foam space (not shown) may be formed between the door frame 41 and the guard support 44, and an insulating material may be foamed in the foam space.

The planar heater 100 may be installed on a back surface of the door frame 41 to remove the dew formation. The planar heater 100 may receive power by being connected to a power supply (or coil driving device) positioned inside the body 10.

The planar heater 100 may be installed to generate heat by receiving the power. In case that the first planar heater 100 is heated up, a temperature of the door frame 41 may be increased. Accordingly, the temperature difference between the door frame 41 and the outside air may be decreased, thereby preventing the dew formation.

The planar heater 100 may have the form of a film and may be attached to the back surface of the door frame 41. One surface of the planar heater 100 may have an adhesive surface having adhesive strength. Without any separate fastening mechanism, the planar heater 100 may be attached to the back surface of the door frame 41 using the adhesive strength of the adhesive surface.

The planar heater 100 may be attached along an outer edge of the door frame 41. The planar heater 100 may be disposed adjacent to a gasket (not shown) of the second door 30, which is installed in front of the door frame 41. In detail, the planar heater 100 may be disposed adjacent to an outer rim of the gasket. The planar heater 100 may be disposed in this manner because the dew may generally be formed on an outer rim of the door frame 41, adjacent to the gasket of the outer door.

Figure 4:
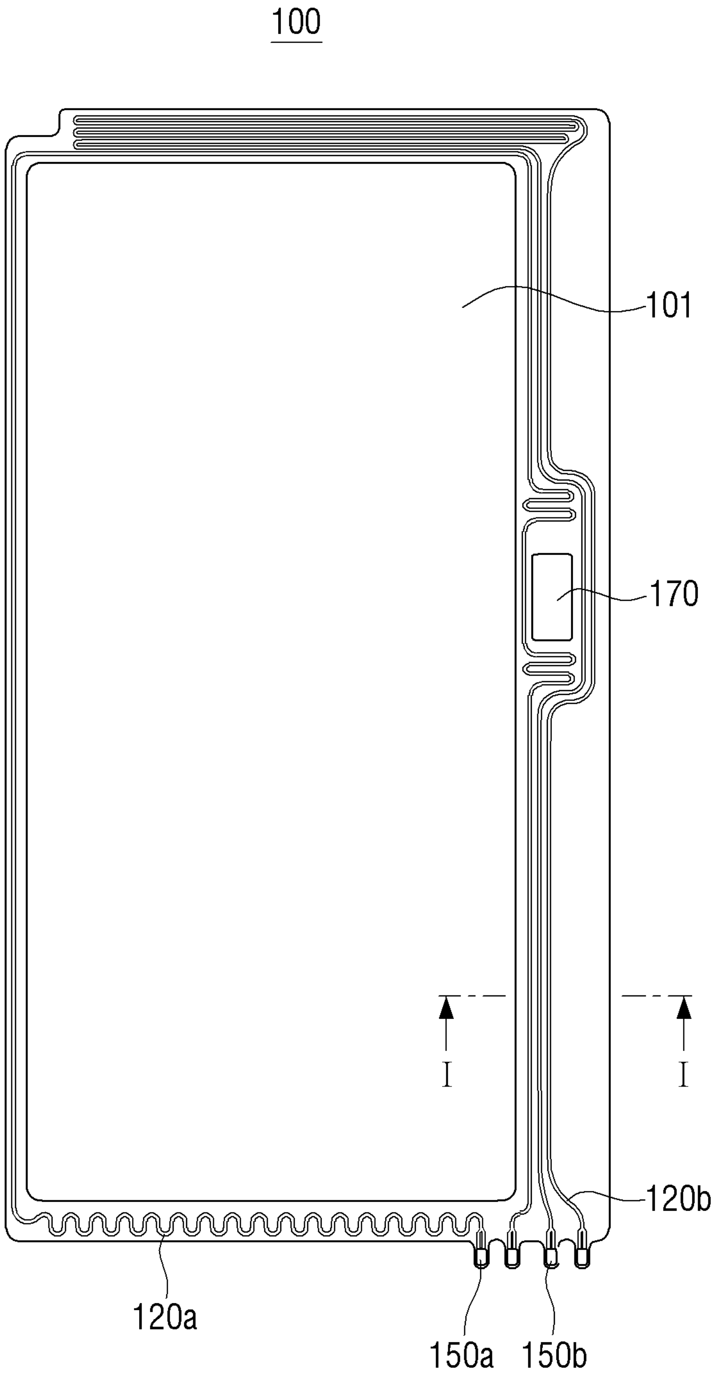
FIG. 4 is a front view of a planar heater in which a plurality of heating wires are arranged.

FIG. 4 is a front view of the planar heater 100 in which a plurality of heating wires 120 (shown as 120*a* and 120*b* in FIG. 4) are arranged. Referring to FIG. 4, the planar heater 100 may have an opening 101 corresponding to the opening of the third door 40, and may have an overall shape corresponding to that of the third door 40.

The planar heater 100 may have the form of the film. The planar heater 100 may include a base film 110 (see FIG. 5), heating wires 120 (shown as 120*a* and 120*b* in FIGS. 4 and 5) printed on the base film and a terminal 150 (shown as 150*a* and 150*b* in FIG. 4) for supplying the power to the heating wires 120 from an external power source (not shown).

The heating wires 120 may be printed on the base film, and may thus maintain a predetermined interval therebetween and be arranged in a specific shape in a fixed position. Therefore, it is possible to prevent a short-circuit between the heating wires 120, and easily manufacture the planar heater 100.

The planar heater 100 may have a separate opening 170 formed in a portion where a latch of the third door 40 is disposed. Through this opening, the planar heater 100 may be attached to the door frame 41 without interference of the latch.

The planar heater 100 may include a plurality of heating wires 120. In detail, the planar heater 100 may include first heating wires 120*a* arranged to surround an edge of the planar heater 100 and second heating wires 120*b* arranged on only one portion of the edge of the planar heater 100.

However, the number of the heating wires 120 is exemplary and is not limited thereto. Additional heating wires 120 may be arranged based on temperature and humidity outside the refrigerator 1, a degree of the dew formation, etc.

It is possible to have the same effect as having a plurality of planar heaters by arranging the plurality of heating wires 120 on one film. In detail, the plurality of heating wires 120 may be printed on the one film, and high heating effect may thus be expected with neither a complicated inner structure of the third door 40 nor an increased thickness of the third door 40.

The second heating wires 120*b* may be arranged on a side edge of the door, most spaced apart from the hinges 70*e* and 70*f* respectively connecting the third door 40 and the body 10 to each other. The side edge may be a portion where a difference between the temperatures inside and outside the third door 40 is the largest as the second door 30 is opened.

That is, the second heating wires 120*b* arranged on the side edge may be driven to intensively generate the heat in a region where the dew may be easily formed, thereby effectively preventing the dew formation phenomenon.

In particular, the second heating wires may be arranged not on the entire edge of the door but on only a portion thereof. Accordingly, the second heating wires may have lower power consumption than the first heating wires, and may be operated in conjunction with or independently from the first heating wires as described below, thereby more efficiently preventing the dew formation phenomenon.

However, the second heating wires 120*b* are not limited to this arrangement, and may be arranged extending to at least one of an upper side edge or a lower side edge, adjacent to the side edge. In addition, it is also possible to experimentally find a position where the most dew is formed on the third door 40 and arrange the second heating wires 120*b* intensively on that position.

In addition, as shown in the drawing, the heating wires 120 may be formed in a zigzag shape in which some sections thereof have winding curves. The heating wires 120 may tend to have its length and heat generation amount proportional to each other. Therefore, it is possible to effectively prevent the dew formation phenomenon in case that the heating wires 120 have the zigzag shape to have a long length in a region where the dew may be easily formed due to the large difference between the temperatures inside and outside the refrigerator 1.

In addition, the first heating wires 120*a* and the second heating wires 120*b* may have heating performances different from each other. For example, the first heating wires 120*a* may have a heating performance of 8 watt (W) and the second heating wires 120*b* may have that of 6 watt (W), but such heating performances are exemplary and may be set in various ways based on a surrounding environment, a target temperature of the refrigerator 1, etc.

That is, the plurality of heating wires 120 may have the heating performances different from each other, and may thus perform heat-generating operation in various cases based on the environment outside the refrigerator 1, thereby effectively preventing the dew formation phenomenon.

The refrigerator 1 may include: a sensor (not shown) configured to measure at least one of temperature and humidity outside the refrigerator 1; and a processor (not shown) configured to control driving of at least one of the first heating wires 120*a* and the second heating wires 120*b* based on a measured value of the sensor.

In detail, the processor may be configured to determine an operating duty of each of the first heating wires 120*a* and the second heating wires 120*b* based on at least one of a difference between temperatures inside and outside the refrigerator 1, and the humidity outside the refrigerator 1, measured by the sensor.

The operating duty of each of the heating wires 120 may refer to a time ratio in which the heating wires 120 are driven per unit time. In detail, the heating wires 120 may not be simply driven in both ON/OFF states, but the driving time ratio may be variously determined based on a condition outside the refrigerator 1.

In detail, in case of determining the operating duty of each of the heating wires based on the measured value received from the sensor, the processor may allow a pulse width modulation (PWM) signal corresponding to the determined operating duty to be output. Accordingly, a current corresponding to the operating duty may flow from the external power source to each of the heating wires 120.

For example, in case that the environment outside the refrigerator 1 has high temperature and high humidity and the dew may thus be easily formed on the third door 40, the sensor may transmit information on the temperature and/or humidity outside the refrigerator to the processor, and the processor may determine a high operating duty of each of the heating wires 120 (for example, 80% and 95% may be the respective operating duties of the first heating wires and the second heating wires).

Meanwhile, in case that the environment outside the refrigerator 1 has low temperature and low humidity and the dew may thus be hardly formed on the third door 40, the sensor may transmit the information on the temperature and/or humidity outside the refrigerator to the processor, and the processor may determine a low operating duty of each of the heating wires 120 (for example, 5% and 15% may be the respective operating duties of the first heating wires and the second heating wires).

That is, the processor may flexibly determine the operating duties of the plurality of heating wires 120 based on the environment outside the refrigerator 1, thereby improving its energy efficiency. In addition, the processor may individually control the plurality of heating wires 120 arranged on positions different from each other to intensively heat a region vulnerable to the dew formation phenomenon (for example, a region where the second heating wires 120*b* are disposed), thereby efficiently preventing the dew formation phenomenon.

In addition, the processor may be configured to determine an operating mode of the refrigerator based on at least one of the temperature and the humidity, measured by the sensor, and may be configured to allow only the first heating wires 120*a* to be driven in case that the determined operating mode is a normal mode and allow the first heating wires 120*a* and the second heating wires 120*b* to be driven together in case that the determined operating mode is a high temperature and high humidity mode.

That is, in case that the temperature or humidity outside the refrigerator 1 is lower than a predetermined value, the processor may determine the operating mode as the normal mode and allow only the first heating wires 120*a* to be driven.

Meanwhile, in case that the temperature or humidity outside the refrigerator 1 is higher than the predetermined value, the processor may determine the operating mode as the high temperature and high humidity mode and allow the first heating wires 120*a* and the second heating wires 120*b* to be driven together.

Through the above-described control manner of the processor, it is possible to prevent unnecessary power waste of the planar heater 100, and achieve flexible and efficient power consumption in response to the environment outside the refrigerator 1.

Figure 5:
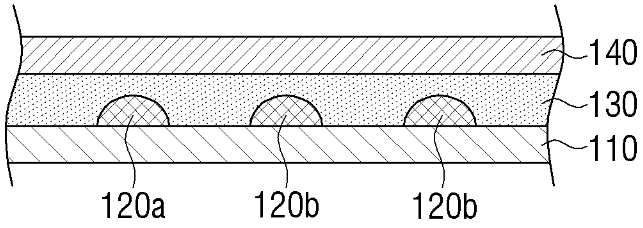
FIG. 5 is a cross-sectional view taken along line I-I of FIG. 4.

FIG. 5 is a cross-sectional view taken along line I-I of FIG. 4. Referring to FIG. 5, the planar heater 100 may include: the base film 110; heating wires 120 printed on one surface of the base film 110 by gravure printing; a protective film 130 laminated on the one surface of the base film 110 to protect the heating wires 120; and a double-sided tape 140 attached to the protective film 130.

The base film 110 may be disposed on one surface of the planar heater 100, and the double-sided tape 140 may be disposed on the other surface of the planar heater 100. The other surface of the planar heater 100 on which the double-sided tape 140 is disposed may have the adhesive strength due to the double-sided tape 140, and may thus be easily adhered and fixed to the door frame 41.

The base film 110 may include polyethylene terephthalate (PET) material.

The heating wires 120 may receive the current and generate the heat. The heating wires 120 may be printed with silver (Ag) nano ink.

The protective film 130 may include polyethyleneterephthalate (PET) and ethylene-vinyl acetate copolymer (EVA) materials.

One surface of the double-sided tape 140 may be attached to the protective film 130. Although not shown in the drawing, the double-sided tape 140 may be attached to the base film 110. The planar heater 100 may have the double-sided tape 140 disposed on its one surface, and may thus be attached to a to-be-attached object by contacting the one surface on which the double-sided tape 140 is disposed to the to-be-attached object.

Figure 6:
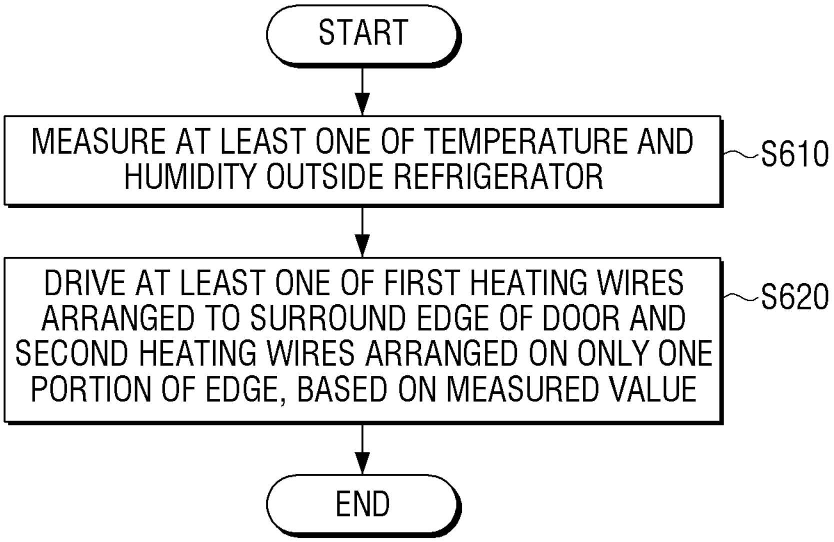
FIG. 6 is a flowchart showing a control method of a refrigerator according to another embodiment of the disclosure.

FIG. 6 is a flowchart showing a control method of a refrigerator according to another embodiment of the disclosure. Referring to FIG. 6, a control method of a refrigerator 1 may include: measuring at least one of temperature and humidity outside the refrigerator 1 (S610); and driving at least one of first heating wires 120*a* arranged to surround an edge of a door and second heating wires 120*b* arranged on only one portion of the edge, based on a measured value (S620).

That is, a sensor may measure at least one of the temperature and humidity outside the refrigerator 1, and the processor may determine whether to allow all or only one of the first heating wires 120*a* and the second heating wires 120*b* arranged at positions different from each other to be driven, depending on whether the measured value received from the sensor meets a predetermined condition.

In addition, the control method of the refrigerator 1 may further include determining an operating mode of the refrigerator based on the measured temperature and humidity, wherein in the driving of the heating wires (S620), only the first heating wires 120*a* may be driven in case that the determined operating mode is a normal mode, and the first heating wires 120*a* and the second heating wires 120*b* may be driven together in case that the determined operating mode is a high temperature and high humidity mode.

For example, in case that the environment outside the refrigerator 1 has high temperature and high humidity, the sensor may transmit information on the temperature and/or humidity outside the refrigerator to the processor, and the processor may determine the operating mode of the plurality of heating wires 120 as the high temperature and high humidity mode and allow the first heating wires 120*a* and the second heating wires 120*b* to be driven together.

Meanwhile, in case that the environment outside the refrigerator 1 has low temperature and low humidity, the sensor may transmit the information on the temperature and/or humidity outside the refrigerator to the processor, and the processor may determine the operating mode of the plurality of heating wires 120 as the normal mode and allow only the first heating wires 120*a* to be driven.

In addition, the control method of the refrigerator 1 may further include determining an operating duty of each of the first heating wires 120*a* and the second heating wires 120*b* based on a difference between temperatures inside and outside the refrigerator 1, and the humidity outside the refrigerator 1, wherein in the driving of the heating wires (S620), at least one of the first heating wires 120*a* and the second heating wires 120*b* may be driven based on the operating duty of each of the first heating wires 120*a* and the second heating wires 120*b*.

That is, the processor may not simply determine on/off state of the plurality of heating wires 120, but may determine the operating duty of each of the heating wires 120 and allow the plurality of heating wires 120 to be driven based on the determined operating duty.

Accordingly, each of the plurality of heating wires 120 may be variously driven with the operating duty having the best power efficiency based on the environment outside the refrigerator 1, thereby more actively preventing the dew formation phenomenon.

Although the embodiments of the disclosure are illustrated and described hereinabove, the disclosure is not limited to the above-mentioned specific embodiments, but may be variously modified by those skilled in the art to which the disclosure pertains without departing from the scope and spirit of the disclosure as disclosed in the accompanying claims. These modifications also need to be understood to fall within the scope of the disclosure.

What is claimed is:

1. A refrigerator comprising:
- a body having a storage compartment;
- a door pivotally coupled to the body to open and close the storage compartment, and having a door frame including an upper frame providing top edge of the door, a lower frame providing a bottom edge of the door, a first side frame providing a first side edge of the door and a second side frame providing a second side edge of the door;
- a planar heater including
  - a first heating wire extending along each of the upper frame, the lower frame, the first side frame and the second side frame, and
  - a second heating wire extending along at least one of the upper frame, the lower frame, the first side frame and the second side frame but not along each of the upper frame, the lower frame, the first side frame and the second side frame;
- a sensor configured to measure at least one of temperature and humidity outside the refrigerator; and
- a processor configured to control driving of at least one of the first heating wire and the second heating wire based on a measured value of the sensor.

2. The refrigerator as claimed in claim 1, further comprising
- hinges, on one of the first side frame and the second side frame, connecting the door and the body to each other,
- wherein the second heating wire extends along the other of the first side frame and the second side frame.

3. The refrigerator as claimed in claim 2, wherein the second heating wire further extends along at least one of the upper frame and the lower frame.

4. The refrigerator as claimed in claim 1, wherein the processor is configured to determine an operating duty of each of the first heating wire and the second heating wire based on at least one of a difference between temperatures inside and outside the refrigerator, and the humidity outside the refrigerator.

5. The refrigerator as claimed in claim 1, wherein the processor is configured to determine an operating mode of the refrigerator based on at least one of the temperature and the humidity, measured by the sensor, and is configured to allow the first heating wire, but not the second heating wire, to be driven in case that the determined operating mode is a normal mode and allow the first heating wire and the second heating wire to be driven together in case that the determined operating mode is a high temperature and high humidity mode.

6. The refrigerator as claimed in claim 1, wherein the first heating wire and the second heating wire have heating performances different from each other.

7. The refrigerator as claimed in claim 1, wherein the planar heater includes:
- a base film, with the first and second heating wires printed on one surface of the base film;
- a protective film laminated on the one surface of the base film to protect the first and second heating wires; and
- a double-sided tape attached to the protective film.

8. The refrigerator as claimed in claim 7, wherein the first and second heating wires are printed with silver (Ag) nano ink.

9. The refrigerator as claimed in claim 7, wherein the base film includes polyethylene terephthalate (PET) material.

10. The refrigerator as claimed in claim 7, wherein the protective film includes ethylene-vinyl acetate copolymer (EVAC) material.

11. The refrigerator as claimed in claim 1, wherein
- the door is an inner door having an opening,
- the planar heater is installed on the inner door, and
- the refrigerator further includes an outer door pivotable in front of the inner door to open and close the opening.

12. A control method of a refrigerator including a door, the door including a door frame, the door frame including an upper frame providing top edge of a door, a lower frame providing a bottom edge of the door, a first side frame providing a first side edge of the door and a second side frame providing a second side edge of the door, and refrigerator further including a planar heater including a first heating wire extending along each of the upper frame, the lower frame, the first side frame and the second side frame, and a second heating wire extending along at least one of the upper frame, the lower frame, the first side frame and the second side frame but not along each of the upper frame, the lower frame, the first side frame and the second side frame, the method comprising:

measuring at least one of temperature and humidity outside the refrigerator; and driving at least one of the first heating wire and the second heating wire, based on a measured value.

13. The control method of a refrigerator as claimed in claim 12, further comprising:

determining an operating duty of each of the first heating wire and the second heating wire based on a difference between temperatures inside and outside the refrigerator, and the humidity outside the refrigerator, wherein in the driving, at least one of the first heating wire and the second heating wire is driven based on the operating duty of each of the first heating wire and the second heating wire.

14. The control method of a refrigerator as claimed in claim 13, further comprising:

determining an operating mode of the refrigerator based on the measured temperature and humidity, wherein in the driving, the first heating wire, but not the second heating wire, is driven in case that the determined operating mode is a normal mode, and the first heating wire and the second heating wire are driven together in case that the determined operating mode is a high temperature and high humidity mode.

* * * * *